Jan. 9, 1968  R. A. FURNANAGE ET AL  3,363,195
JUNCTION DIODE MASER

Filed July 1, 1963  2 Sheets-Sheet 1

INVENTORS: R.A. FURNANAGE
D.K. WILSON
BY
*Sylvan Sherman*
ATTORNEY

United States Patent Office 3,363,195
Patented Jan. 9, 1968

3,363,195
JUNCTION DIODE MASER
Richard A. Furnanage, Murray Hill, and Donald K. Wilson, Morristown, N.J., assignors to Bell Telephone Laboratories, Incorporated, New York, N.Y., a corporation of New York
Filed July 1, 1963, Ser. No. 291,645
9 Claims. (Cl. 331—94.5)

This invention relates to injection type masers and, in particular, to means for controlling the distribution of radiant energy obtained from such masers.

Stimulated emission has recently been observed from forward biased GaAs p-n junctions and numerous papers have been published describing this phenomenon. (See, for example, Applied Physics Letters 1, 62, 1962, by M. I. Nathan, W. P. Dumke, G. Burns, F. H. Dill, Jr., and J. Lasher; also see Physical Review Letters, Nov. 1, 1962 "Coherent Light Emission From GaAs Junctions," by R N. Hall, G. E. Fenner, J. D. Kingsley, T. J. Soltys, and R. O. Carlson.)

It has been found that such devices exhibit a number of different modes, or geometrical distributions of electromagnetic energy, when stimulated emission occurs. This condition occurs because the active "Q's" for the different modes are approximately equal. Some control over the modes has been achieved by polishing (or cleaving) certain faces of the excited crystal. However, such polished crystals still exhibit many different modes of stimulated emission.

It is, accordingly, an object of this invention to control the modes which build up in an injection type maser under conditions of stimulated emission.

It is a more specific object of this invention to cause a build up of stimulated emission in an injection type maser in a preferred direction and wavelength.

In accordance with the invention, a more precise selection of the modes in an injection type diode maser is achieved by the selection of the geometry of the active region of the device and by the orientation of the active region with respect to the reflecting surfaces defining the maser cavity. In the simplest case the cleaved or polished edges of the diode crystal are used as the reflecting surfaces. Alternatively, external reflecting surfaces can be used.

In particular the geometry and orientation of the active region with respect to the crystal geometry is such as to favor the build up of stimulated emission in a preferred direction and to inhibit the build up of stimulated emission in other directions.

In a first illustrative embodiment of the invention, the active region is in the shape of a long, narrow rectangle or stripe whose length to width ratio is large. Because of the particular configuration of the active region, the device is called a "stripe laser."

The edges of the crystal perpendicular to the long dimension of the active region are polished (or cleaved) and are oriented parallel to each other to form a resonant cavity. Preferably the active region extends up to these crystal edges.

The crystal edges parallel to the long dimension of the active region are located relatively far from the active region. The nature and orientation of these edges appear to be of little import.

In a second embodiment of the invention two parallel, active regions are placed on opopsite sides of the diagonal of a crystal having a square cross-sectional surface. As in the first embodiment, the active regions are elongated rectangles. However, in this embodiment their long dimensions make a forty-five degree angle with the crystal edges.

In both embodiments the favored modes are the ones having the highest ratio of active path-length to inactive path-length. These modes, having the higher active "Q's," build up in preference to modes in other directions.

A further reduction in the number of modes that build up is obtained by segmenting the active region. This imposes additional boundary conditions which make it possible to select essentially a single allowable mode from within the spectral linewidth.

The various embodiments of the invention are particularly useful in that the stimulated radiant energy, which is typically within the visible portion of the frequency spectrum, is concentrated along a given direction. This makes it convenient, for example, to modulate the light by forming a second p-n junction adjacent to the first in the manner described in the copending application by A. Ashkin and M. Gershenzon, Ser. No. 265,511 filed Mar. 15, 1963, now Patent No. 3,295,911 issued Jan. 3, 1967.

These and other objects and advantages, the nature of the present invention, and its various features, will appear more fully upon consideration of the various illustrative embodiments now to be described in detail in connection with the accompanying drawings, in which.

Figure 1:
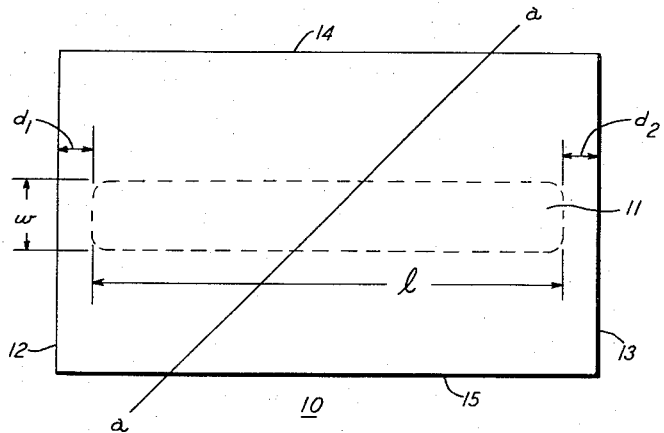
FIG. 1 shows the active region in a junction diode maser in accordance with the invention.

Referring to FIG. 1, there is shown in a plan view a semiconductor p-n junction maser 10. Also shown in outline is the area 11 of the active region of the maser in accordance with the invention.

As is known, coherent light in the visible or near visible portion of the spectrum can be obtained from forward biased p-n junctions of certain materials such as, for example, gallium arsenide, indium phosphide, or indium arsenide. Stimulated emission occurs when the injection current density in the junction exceeds a specified threshold. The term "active region" as used herein is defined as that region of the junction in which the current density exceeds the threshold density.

In a typical junction maser, the active region is contained within a cavity having a resonance which falls within the spectral range within which stimulated emission is possible.

The stimulated emission propagates in essentially all directions substantially parallel to the plane of the junction and builds up in many modes for which the "Q's" are comparable.

In the junction maser shown in FIG. 1, the active region 11 has a long dimension $l$ and a narrow dimension $w$. The maximum ratio of $l$ to $w$ is dictated by the diffraction loss and is given by $l/w \leq \sqrt{l/4\lambda}$, where $\lambda$ is the wavelength of the emitted energy.

Theoretically, the minimum useful ratio of $l/w$ can be unity. However, practical considerations suggest a ratio greater than one. Advantageously, a ratio of at least ten is used.

The active area is oriented so that the crystal edges 12 and 13 are perpendicular to the long dimension $l$ and are closer to the active region than the edges 14 and 15. In the limit, the active region can extend up to the edges 12 and 13. The effect of this geometry is to favor the build up of stimulated emission in a direction parallel to thel ong dimension of the active region for it is along this direction that the ratio of active path-length to inactive path-length is highest. That is, the ratio of length $l$ to the distance $d_1+d_2$, where $d_1$ and $d_2$ are the distances between the active region and edges 12 and 13, respectively, is higher than the ratio of similar distances taken in any other direction between reflecting surfaces. Thus, this ratio in the preferred direction is greater than this ratio along any other line $a$—$a$.

In an embodiment such as described above, stimulated emission builds up in a direction parallel to the long dimension of the active region since it is in this direction that the active Q is highest.

Figure 2:
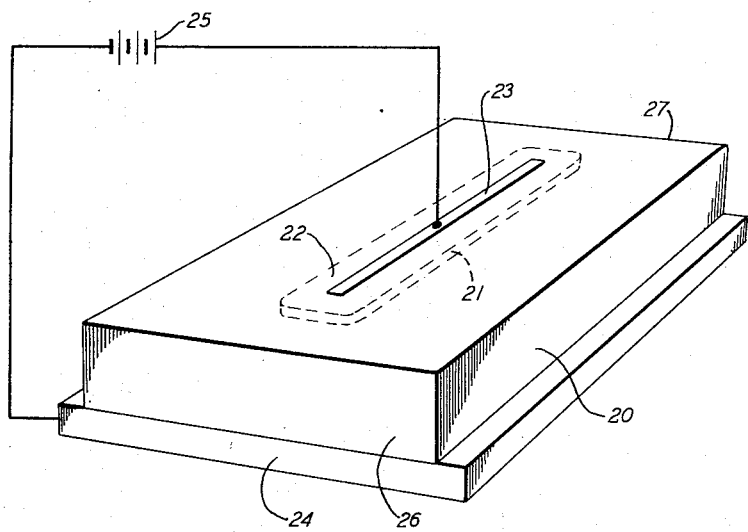
FIGS. 2 and 3 are illustrative embodiments of the invention having the preferred active region as shown in FIG. 1.

In FIG. 2 there is shown a diode designed to produce an active region having the configuration shown in FIG. 1.

In the embodiment of FIG. 2, the diode comprises a semiconducting crystal 20 of rectangular parallelopiped shape, the bulk of which is of one conductivity type, such as, for example, n-type GaAs, and which also includes the localized p-type region 22 forming p-n junction 21. This can be done by diffusing locally into an n-type GaAs crystal a p-type diffusant, or by any other technique known in the art. Separate ohmic contact is made to each region by means of metallic electrodes 23 and 24. A source of current 25, for forward biasing the diode is connected between the electrodes.

In the simplest arrangement, the front and back surfaces 26 and 27 of crystal 20 are cleaved or polished to provide the reflecting surfaces for inducing cavity modes in the direction parallel to the long dimension of the p-n junction. While it is convenient to polish such surfaces entirely, it is important only that those portions aligned with the junction region 21 be polished to be made highly reflective. It has been found that no particular treatment of the remaining two sides of the crystal 20 is required.

When the current density through the junction exceeds the threshhold density, stimulated emission builds up in a direction parallel to the long dimension of the junction and coherent, radiant energy is emitted from both narrow ends of the junction. To confine the radiant energy to only one end as, for example, the end nearest surface 26, an opaque, reflecting surface (not shown) can be placed at the other end adjacent to surface 27.

Figure 3:
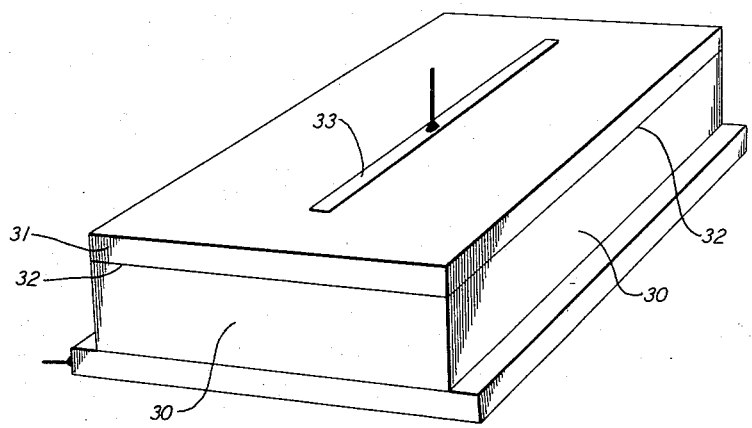

In FIG. 3 there is illustrated an alternative embodiment of the invention in which the p-n junction occupies the entire surface area between the edges of the crystal, although only a selected portion serves as the active region.

In this embodiment the diode comprises a crystal, the bulk 30 of which is of one conductivity type, and a thin surface layer 31 which is of opposite conductivity type for forming p-n junction 32 therebetween.

To confine the active region as desired, layer 31 is controlled tin thickness such that the lateral or sheet resistance is significant. A metallic contact 33, having the shape of the active region desired, is placed in contact with the layer 31 to form one of the diode contacts.

If the sheet resistance $R_s$ of layer 32 is selected such that $$I_t R_s \gg \frac{kT}{q}$$

where $I_t$ is the threshold current for stimulated emission,
$k$ is Boltzman's constant,
$q$ is the electron charge, and
T the temperature in degrees Kelvin, the lateral spreading of the current is small due to the large spreading resistance and the active region is confined to the neighborhood of the contact. Thus, if the geometry of contact 33 is rectangular, having a long dimension that is larger than its narrow dimension, the active region resulting from the arrangement shown in FIG. 3 is substantially the same as that produced by the embodiment of FIG. 2.

Figure 4:
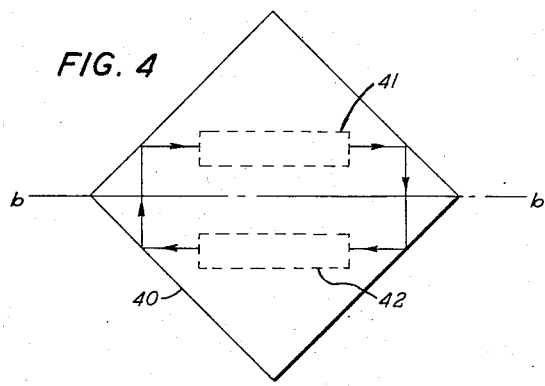
FIG. 4 is another embodiment of the invention having two active regions of the type shown in FIG. 1.

In still another embodiment of the invention, illustrated in FIG. 4, two elongated, rectangular active areas are employed. They are disposed parallel to each other and with their long dimensions oriented at forty-five degrees to the crystal edges.

More specifically, a crystal 40 of square cross section is used upon which two active junction regions 41 and 42 are formed. These regions can be made in a manner similar to either of the illustrative methods described above or in any other way known in the art. The regions are symmetrically located on opposite sides of a diagonal, such as $b$—$b$, of the square section of the crystal, with the long dimensions of the active regions preferably oriented at forty-five degrees with respect to the crystal edges. All four edges of the crystal are polished (or cleaved) to provide efficient reflecting surfaces. So oriented, stimulated emission builds up along a path including the long dimensions of the active regions, as indicated in FIG. 4, in preference to any other modes. Provision can be made for letting some of the maser light exit from one or more surfaces as desired.

In each of the embodiments described above, the polished (or simply cleaved) edges of the diode crystal are used as the reflecting surfaces that define the maser cavity. Alternatively, however, external reflecting surfaces can be provided. For example, external, parallel reflecting surfaces or external confocal reflecting surfaces can be used. More generally, however, any of the cavity arrangements known in the art can be employed.

While the various arrangements described hereinabove tend to limit the modes that are induced to those along a particular direction, there, nevertheless, can still be a large number of such possible modes. If L is the total cavity length, all modes which lie within the spectral linewidth and satisfy the relation $n\lambda/2 = L$ are possible, where $n$ is an integer.

It can be shown that the spacing $\Delta\lambda$ between the modes which satisfy the relation $n\lambda/2 = L$ is inversely proportional to the cavity length L. Accordingly, to further reduce the number of permissible modes, (i.e., increase $\Delta\lambda$) additional boundary conditions are imposed by segmenting the active region. This has the effect of reducing L and, hence, increasing $\Delta\lambda$.

Segmentation of the active region can be achieved either by forming a plurality of discrete junction areas or by making one of the conductivity type regions as a very thin surface layer and making a plurality of ohmic contacts along this layer as in the embodiment of FIG. 3.

Figure 5:
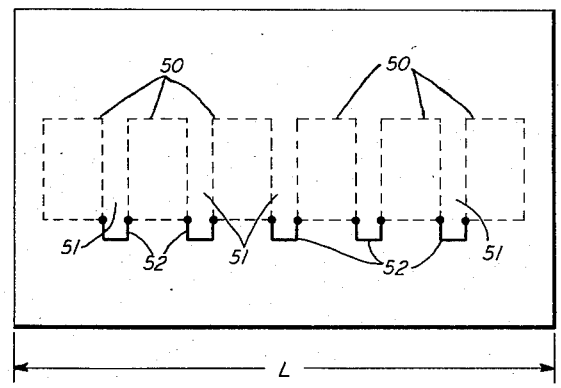
FIG. 5 is an embodiment of the invention having a segmented active region for reducing the number of permissible modes.

In FIG. 5 there is shown a diode comprising a plurality of discrete active regions 50 separated by inactive regions 51. All of the regions 50 are shown conductively connected to each other by metallic means 52 to provide injection current to all of them.

The effect of this segmentation of the junction area is to impose further restrictions on the longitudinal modes that can build up. Thus, if each pair of adjacent discontinuities is considered to be a separate cavity, the modes that build up have to satisfy the added restriction that $$k\frac{\lambda}{2} = D$$

where $k$ is an integer and D the distance between adjacent discontinuities. If the length of each of the segmented junction regions is relatively large compared to the distance between segments, it is the latter distance that has the greater effect upon the mode selection. Accordingly, if a mode having a wavelength $\lambda_0$ is to be selected from within the spectral line, the distance D between segments is selected such that $$k\frac{\lambda_0}{2} = D$$

The selection effect can be further enhanced, if necessary, by successively increasing the distances between adjacent segments by multiples of $\lambda_0/2$.

Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A semiconductor diode maser having an elongated p-n junction whose long dimension is substantially greater than its narrow dimensions;

said junction extending between reflective edges of said diode with its long dimension perpendicular thereto;

said junction being further located with respect to the edges of said diode such that the ratio of distances along said junction to the distance between said junction and the edges of said diode taken in the direction parallel to the long dimension of said junction is greater than said same ratio of distances taken other direction;

and means for forward biasing said diode above the threshold level.

2. A semiconductor diode maser comprising a semiconductor crystal having a bulk conductivity of one type and a thin surface layer of opposite conductivity type for forming a p-n junction therebetween;

said thin surface layer having a sheet resistance $R_s$ given by $$I_t R_s \gg \frac{kT}{q}$$

where
$I_t$ is the threshold current for stimulated emission,
$k$ is Boltzman's constant,
$q$ is the electron charge, and
T the temperature in degrees Kelvin;

means for making an ohmic connection to said layer comprising an elongated metallic electrode having a long dimension substantially greater than its narrow dimension and being oriented with its long dimension substantially perpendicular to opposite edges of said diode;

and reflective means adjacent to said edges for reflecting wave energy emitted by said junction.

3. A diode maser comprising a wafer of semiconducting material of square cross section having four reflecting edges and two discrete elongated p-n junctions whose lengths are greater than their widths;

said junctions being symmetrically disposed with respect to a diagonal of said square cross section and oriented with their long dimension at a forty-five degree angle with respect to the wafer edges.

4. A diode maser having a ratio of active path-length to inactive path-length in a given direction that is greater than said ratio in any other direction;

and reflecting means disposed solely on opposite sides of said diode along said given direction for reflecting therebetween radiant energy emitted by said diode.

5. A diode maser comprising a plurality of spaced p-n junctions;

said junctions being spaced in a direction extending over an interval that is long compared to its width;

and reflecting means located solely at the ends of said interval for reflecting therebetween radiant energy emitted by said junctions.

6. The maser according to claim 5 wherein said junctions are equally spaced.

7. The maser according to claim 5 wherein the spaces between adjacent junctions differ by integral multiples of half a wavelength for a preferred frequency within the spectral linewidth of said maser.

8. A semiconductor diode maser comprising a semiconductor crystal having a bulk conductivity of one type and a thin surface layer of opposite conductivity type for forming a p-n junction therebetween;

said thin surface layer having a sheet resistance $R_s$ given by $$I_t R_s \gg \frac{kT}{q}$$

where
$I_t$ is the threshold current for stimulated emission,
$k$ is Boltzman's constant,
$q$ is the electron charge, and
T the temperature in degrees Kelvin;

means for making a plurality of spaced ohmic contacts to said layer;

said plurality of contacts extending over an interval that is long compared to their width;

and reflecting means located at the ends of said interval.

9. A diode maser comprising:

a semiconductor crystal having a square cross section, and two discrete active regions separated by an inactive region;

characterized in that said two active regions, whose lengths are substantially greater than their widths, are symmetrically disposed with respect to a diagonal of said cross section and oriented with their long dimensions at a 45 degree angle with respect to the crystal edges;

and in that means are provided for reflective wave energy incident upon the crystal edges.

References Cited

UNITED STATES PATENTS

| | | | |
|---|---|---|---|
| 3,245,002 | 5/1966 | Hall | 331—94.5 |
| 3,247,576 | 5/1966 | Dill. | |
| 3,248,670 | 5/1966 | Dill | 331—94.5 |
| 3,257,626 | 6/1966 | Marinace | 331—94.5 |

JEWELL H. PEDERSEN, *Primary Examiner.*

E. S. BAUER, R. L. WIBERT, *Assistant Examiners.*